United States Patent
Shiratori et al.

(10) Patent No.: US 9,330,713 B2
(45) Date of Patent: *May 3, 2016

(54) LINEAR RECORDING EXECUTING OPTIMUM WRITING UPON RECEIPT OF SERIES OF COMMANDS INCLUDING MIXED READ AND WRITE COMMANDS

(71) Applicant: International Business Machines Corporation, Armonk, NY (US)

(72) Inventors: Toshiyuki Shiratori, Tokyo (JP); Kohei Taguchi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/836,874

(22) Filed: Aug. 26, 2015

(65) Prior Publication Data

US 2015/0370714 A1    Dec. 24, 2015

Related U.S. Application Data

(63) Continuation of application No. 14/566,620, filed on Dec. 10, 2014, now Pat. No. 9,135,949, which is a continuation of application No. 14/126,839, filed as application No. PCT/JP2012/060139 on Apr. 13, 2012, now Pat. No. 8,929,020.

(30) Foreign Application Priority Data

Jun. 24, 2011 (JP) .................................. 2011-141259

(51) Int. Cl.
*G11B 20/10* (2006.01)
*G11B 27/11* (2006.01)
(Continued)

(52) U.S. Cl.
CPC .............. *G11B 20/10* (2013.01); *G06F 3/0611* (2013.01); *G06F 3/0656* (2013.01);
(Continued)

(58) Field of Classification Search
CPC .......... G06F 3/0682; G06F 2003/0691; G06F 2003/0698; G06F 3/0611; G11B 5/00813; G11B 5/00817; G11B 20/10527; G11B 27/00; G11B 27/11; G11B 2020/10898; G11B 2020/10907; G11B 2220/655; G11B 2220/90; G11B 2220/93; G11B 20/10
USPC .................................. 360/15, 69, 72.1, 55, 75
See application file for complete search history.

(56) References Cited

U.S. PATENT DOCUMENTS 6,715,033 B2  3/2004  Nonoyama et al.
6,763,427 B1  7/2004  Doi et al.
(Continued)

FOREIGN PATENT DOCUMENTS

CN  101226505 A  7/2008
JP  2000048549 A  2/2000
(Continued)

OTHER PUBLICATIONS

Bell, T., "Tape Efficiency," https:fltwiki.cern.ch/twiki/pub/FIOgroup/TapeRefCernUsageNov2007/tape_usage_efficiencLv05.pdf, Nov. 2007, pp. 1-19.
(Continued)

*Primary Examiner* — Ali Neyzari
(74) *Attorney, Agent, or Firm* — Zilka-Kotab, PC

(57) ABSTRACT

An apparatus according to one embodiment includes a head, a controller coupled to the head, and logic integrated with and/or executable by the controller. The logic is configured to receive a series of commands, the series of commands including mixed read, overwrite, and append write commands, cause reading of data from a specified position of a tape using the head and storing the data in a buffer in response to a read command; and cause writing of data stored in the buffer starting from an appended data end position of the tape in response to an append write command.

20 Claims, 12 Drawing Sheets

(51) Int. Cl.
   *G11B 5/008* (2006.01)
   *G11B 27/00* (2006.01)
   *G06F 3/06* (2006.01)
   *G06F 12/08* (2016.01)

(52) U.S. Cl.
   CPC ......... *G06F 3/0682* (2013.01); *G06F 12/0868* (2013.01); *G11B 5/00813* (2013.01); *G11B 5/00817* (2013.01); *G11B 20/10527* (2013.01); *G11B 27/00* (2013.01); *G11B 27/11* (2013.01); *G06F 2003/0691* (2013.01); *G06F 2003/0698* (2013.01); *G06F 2212/1012* (2013.01); *G06F 2212/213* (2013.01); *G06F 2212/222* (2013.01); *G06F 2212/253* (2013.01); *G06F 2212/452* (2013.01); *G11B 2020/10898* (2013.01); *G11B 2020/10907* (2013.01); *G11B 2220/655* (2013.01); *G11B 2220/90* (2013.01); *G11B 2220/93* (2013.01)

(56) References Cited

U.S. PATENT DOCUMENTS

| | | | |
|---|---|---|---|
| 6,839,801 B2 * | 1/2005 | Jaquette | G06F 3/0613 711/111 |
| 7,853,761 B2 | 12/2010 | Masuo | |
| 8,373,896 B2 | 2/2013 | Tsutsumi | |
| 8,397,136 B2 | 3/2013 | Masuda et al. | |
| 8,400,897 B2 | 3/2013 | Itagaki et al. | |
| 8,477,440 B2 | 7/2013 | Itagaki et al. | |
| 8,929,020 B2 | 1/2015 | Shiratori et al. | |
| 9,135,949 B2 * | 9/2015 | Shiratori | G11B 20/10 |
| 2008/0162803 A1 | 7/2008 | Masuo | |
| 2009/0177947 A1 | 7/2009 | Masuda et al. | |
| 2009/0296120 A1 | 12/2009 | Tsutsumi | |
| 2011/0122522 A1 | 5/2011 | Itagaki et al. | |
| 2011/0157741 A1 | 6/2011 | Shiratori et al. | |
| 2011/0176238 A1 | 7/2011 | Shiratori et al. | |
| 2014/0226236 A1 | 8/2014 | Shiratori et al. | |
| 2014/0379980 A1 | 12/2014 | Hasegawa et al. | |
| 2015/0098148 A1 | 4/2015 | Shiratori et al. | |

FOREIGN PATENT DOCUMENTS

| | | |
|---|---|---|
| JP | 2008165881 A | 7/2008 |
| JP | 2009294309 A | 12/2009 |
| JP | 2011113605 A | 6/2011 |
| JP | 2011134413 A | 7/2011 |
| WO | 2012176539 A1 | 12/2012 |

OTHER PUBLICATIONS

Osborne, T., "Castor Monitoring," http://castorweb.cern.ch/castorold/presentations/2006/Review/Castor_Monitoring.pdf, 2006, pp. 1-60.

International Preliminary Report from International Application No. PCT/JP2012/060139, dated Mar. 6, 2014.

International Search Report and Written Opinion from PCT Application No. PCT/JP2012/060139, dated May 29, 2012.

Non-Final Office Action from U.S. Appl. No. 14/126,839, dated Jun. 5, 2014.

Notice of Allowance from U.S. Appl. No. 14/126,839, dated Aug. 28, 2014.

Non-Final Office Action from U.S. Appl. No. 14/566,620, dated Jan. 16, 2015.

Notice of Allowance from U.S. Appl. No. 14/566,620, dated May 8, 2015.

Shiratori et al., U.S. Appl. No. 14/126,839, filed Apr. 21, 2014.
Shiratori et al., U.S. Appl. No. 14/566,620, filed Dec. 10, 2014.

* cited by examiner

RELATIONSHIP IN MOVING DISTANCE INCREASE OR DECREASE BETWEEN OMISSION OF SYNCHRONIZATION OPERATION AND SUBSEQUENT REWRITE OPERATION

| NO. | RELATIONSHIP BETWEEN MOVING DISTANCE (CURRENT POSITION A→TARGET POSITION) AND REWRITING POSITION (X→Y) | MOVING DIRECTION AND WRITING DIRECTION | REDUCTION DUE TO OMISSION OF SYNCHRONIZATION OPERATION | INCREASE IN REWRITE OPERATION DURING SUBSEQUENT MOVEMENT |
|---|---|---|---|---|
| 1-a | MOVING TARGET POSITION B IS IN SAME DIRECTION AS WRITING START POSITION X AND COMPLETION POSITION Y, AND THERE IS COMPLETE OVERLAP | SAME DIRECTION | EQUAL | NOT INCREASED |
| 1-b | MOVING TARGET POSITION B IS IN SAME DIRECTION AS WRITING START POSITION X AND COMPLETION POSITION Y, AND THERE IS COMPLETE OVERLAP | OPPOSITE DIRECTION | REDUCED BY DISTANCE OF SINGLE RECIPROCATION BETWEEN POSITION X AND Y | INCREASED BY DISTANCE OF SINGLE RECIPROCATION BETWEEN POSITION X AND Y |
| 2-a | MOVING TARGET POSITION C IS IN SAME DIRECTION AS WRITING START POSITION X AND COMPLETION POSITION Y, AND THERE IS PARTIAL OVERLAP | SAME DIRECTION | REDUCED BY DIFFERENCE BETWEEN POSITION X → Y → C AND POSITION X → C | INCREASED BY DISTANCE OF DIFFERENCE BETWEEN POSITION X → Y → C AND POSITION X → C |
| 2-b | MOVING TARGET POSITION C IS IN SAME DIRECTION AS WRITING START POSITION X AND COMPLETION POSITION Y, AND THERE IS PARTIAL OVERLAP | OPPOSITE DIRECTION | REDUCED BY DISTANCE OF SINGLE RECIPROCATION BETWEEN POSITION X AND Y | INCREASED BY DISTANCE OF SINGLE RECIPROCATION BETWEEN POSITION X AND Y |
| 3-a | MOVING TARGET POSITION D IS IN SAME DIRECTION AS WRITING START POSITION X AND COMPLETION POSITION Y, AND THERE IS NO OVERLAP | SAME DIRECTION | REDUCED BY DISTANCE OF MOVEMENT OF POSITION D → X → Y → D | INCREASED BY DISTANCE OF MOVEMENT OF POSITION D → X → Y → D |
| 3-b | MOVING TARGET POSITION D IS IN SAME DIRECTION AS WRITING START POSITION X AND COMPLETION POSITION Y, AND THERE IS NO OVERLAP | OPPOSITE DIRECTION | REDUCED BY DISTANCE OF MOVEMENT OF POSITION D → Y → X → Y → D | INCREASED BY DISTANCE OF MOVEMENT OF POSITION D → Y → X → Y → D |
| 4-a | MOVING TARGET POSITION E IS IN OPPOSITE DIRECTION AS WRITING START POSITION X AND COMPLETION POSITION Y, AND THERE IS NO OVERLAP | SAME DIRECTION | REDUCED BY DISTANCE OF MOVEMENT OF POSITION A → X → Y → A | INCREASED BY DISTANCE OF MOVEMENT OF POSITION A → X → Y → A |
| 4-b | MOVING TARGET POSITION E IS IN OPPOSITE DIRECTION AS WRITING START POSITION X AND COMPLETION POSITION Y, AND THERE IS NO OVERLAP | OPPOSITE DIRECTION | REDUCED BY DISTANCE OF MOVEMENT OF POSITION A → X → Y → A | INCREASED BY DISTANCE OF MOVEMENT OF POSITION A → X → Y → A |

FIG. 6

LINEAR RECORDING EXECUTING OPTIMUM WRITING UPON RECEIPT OF SERIES OF COMMANDS INCLUDING MIXED READ AND WRITE COMMANDS

FIELD OF THE INVENTION

The present invention relates to data storage, and more specifically, the present invention relates to a linear recording tape storage device which executes optimum writing upon receipt of a series of commands including mixed read and write commands (Read and Write), and to a method and a program for executing the same.

BACKGROUND

A tape recording device (a tape drive) is a sequential access device. Drive operations include mount/load and unmount/unload of a tape cartridge. Tape operations include operations on a tape medium which are position movement (a Position command), writing (a Write command), reading (a Read command) and synchronization (a Sync command: Synchronize).

Data to be written in the tape includes user data and a file marker (FM) representing a user data delimiter. A write operation is performed either in a write-append method in which data is written in the tape from a position past the end of data after the tape is moved, or in an overwriting method in which old data is overwritten with new data.

Normally, the tape drive is able to perform read and write operations in a mixed manner, and these operations involve a moving operation and a synchronization operation (flush). The synchronization and moving operations cause the tape to move in a longitudinal direction thereof, thereby lowering the Read and Write performance of the tape drive. Note that the synchronization operation is an operation of ensuring that data temporarily stored in a buffer is written in a tape medium.

A hierarchical storage management (HSM) system allows the mixed read and write operations to be performed on tape drives. The tape drive is also included in a tape library which is at a lower layer of the HSM system. A single tape drive, however, is not required to perform read and write operations in a mixed manner in order to prevent the lowering of the overall performance of the entire read and write processing. Instead, the single tape drive performs either the write operation or the read operation for each mount of a tape cartridge. Alternatively, a plurality of tape drives may each be used for either of write and read operations. These techniques require more tape drives, increase time-consuming (effort-taking) mount operations, and thus lower the processing performance.

There are some environments in which a tape cartridge is used exclusively for a read or write operation. Large-scaled scientific and technical calculations, in particular, cannot achieve higher performance, if a single tape cartridge is used for both mixed read and write operations. This also holds true for a hierarchical storage system which includes general tape storage devices.

Japanese Patent Application No. 2009-294309 provides a mechanism for causing a tape drive to perform read/write operations in a mixed manner in a single cartridge. Here, the writing method is an append writing method (Append Write). In the append writing method, the end of data (EOD) of write data in a tape is sequentially brought back by using a sequential moving method of the tape drive.

The writing method of a tape drive, however, includes Over Write in addition to the append write. The Over Write command is used to overwrite data (for example, a data set) having been written on a tape with new data by using the append write.

Accordingly, it is necessary to consider a case where the Over Write is received in mixed read/write operations in a single tape drive and tape cartridge.

BRIEF SUMMARY

An apparatus according to one embodiment includes a head, a controller coupled to the head, and logic integrated with and/or executable by the controller. The logic is configured to receive a series of commands, the series of commands including mixed read, overwrite, and append write commands, cause reading of data from a specified position of a tape using the head and storing the data in a buffer in response to a read command; and cause writing of data stored in the buffer starting from an appended data end position of the tape in response to an append write command.

According to another embodiment, a computer program product for writing data to tape includes a computer readable storage medium having program instructions embodied therewith, the program instructions executable by a computer to cause the computer to perform a method. The method includes receiving, by the computer, a series of commands, the series of commands including mixed read, overwrite, and append write commands. The method further includes causing, by the computer, reading of data from a specified position of the tape using a head and storing the data in a buffer in response to a read command. The method further includes causing, by the computer, writing data stored in the buffer starting from an appended data end position of the tape in response to an append write command.

In yet another embodiment, an apparatus includes a head, a controller coupled to the head, and logic integrated with and/or executable by the controller. The logic is configured to, in response to receipt of an append write command, cause storing of data stored in a buffer to a non-volatile memory starting from an appended data end position. The logic is also configured to cause sending a completion notification of the append write command to a higher-level device when data in the buffer is written in the non-volatile memory. The logic is also configured to cause moving to a tape writing position where the data stored in the non-volatile memory is to be written. The logic is also configured to cause performance of append writing on a basis of a predetermined criterion so as to minimize a moving distance by which a tape travels relative to a head, when moving from an end position on the tape of read data for a m-th read command to a reading start position for a subsequent n-th read command, wherein n=m+1.

Other aspects and embodiments of the present invention will become apparent from the following detailed description, which, when taken in conjunction with the drawings, illustrate by way of example the principles of the invention.

It is preferable to provide a (linear recording) tape storage device having an optimum method of writing upon receipt of overwrite in the midst of performing read/write operations in a mixed manner, and a method and a program for executing the same.

In one general embodiment, a tape recording device which performs operations of position movement, reading, and writing on a tape medium back and forth in a longitudinal direction of the tape medium and which receives a series of commands from a higher-level device is presented. The series of commands includes mixed read (Read), overwrite, and append write (Write) commands and the plurality of read commands includes first, second, . . . m-th, n-th . . . (m, n=m+1) read commands in this order. The tape recording device includes: a buffer for storing data related to the reading and writing; a tape for recording the data stored in the buffer; a read/write head for reading the data from the tape into the buffer and writing the data from the buffer onto the tape; control means, a controller configured for reading data from the specified position of the tape and storing the data in the buffer in response to a read command and for writing the data stored in the buffer from an appended data end position for data writing of the tape, e.g., end of data (EOD), in response to an append write command; and a non-volatile memory for storing the data stored in the buffer in response to a write command. Furthermore, in this embodiment, the controller may be configured to: (a) upon receipt of the append write command, store the data stored in the buffer from an appended data end position in the non-volatile memory (EOD in the non-volatile memory); (b) send back a completion notification of the append write command to the higher-level device when the data in the buffer is written in the non-volatile memory; (c) move the data temporarily stored in the non-volatile memory and then moving to a tape writing position (EOD) where the data temporarily stored in the non-volatile memory is to be written to perform writing on the basis of a predetermined criterion so as to minimize a moving distance by which the tape travels relative to the head, when moving from an end position on the tape of read data for the m-th read command to a reading start position for the n-th read command after receipt of the append write command; and (d) when receiving an overwrite command (Over Write) of data in a predetermined position on the tape between the mixed commands in the series of commands, wherein the overwrite command causes the end of written data to be in a data end position (EOD), update the overwrite data position as an appended data end position (EOD) when the tape position for overwriting the data is earlier (a value smaller) than the appended data end position of the tape (EOD), and update the overwrite data position as an appended data end position in the non-volatile memory (EOD in the non-volatile memory) when the tape position for overwriting the data is later (a value greater) than the appended data end position of the tape (EOD).

The device is characterized in that the criterion is satisfied when the data end position of the tape (EOD) at which the data is to be written exists within the moving distance (between the end position and the start position) according to one embodiment.

The device is further characterized in that the controller stores the updated data end position (EOD) into the non-volatile memory.

The device is also characterized in some approaches in that the controller stores the updated data end position (EOD) into the non-volatile memory of the tape cartridge which includes the tape.

In another general embodiment, a method for writing into a tape recording device includes the steps of: (a) upon receipt of the append write command, storing the data stored in the buffer in an appended data end position in the non-volatile memory (EOD in the non-volatile memory); (b) sending back a completion notification of the append write (synchronization) command to the higher-level device when the data in the buffer is written in the non-volatile memory; (c) moving the data temporarily stored in the non-volatile memory and then moving to a tape writing position (EOD) where the data temporarily stored in the non-volatile memory is to be written to perform writing on the basis of a predetermined criterion so as to minimize a moving distance by which the tape travels relative to the head, when moving from an end position on the tape of read data for the m-th read command to a reading start position for the subsequent n-th read command; and (d) when receiving an overwrite (Over Write) command of data in a predetermined position on the tape between the mixed commands in the series of commands wherein the overwrite command causes the end of the written data to be in a data end position (EOD), updating the overwrite data position as an appended data end position (EOD) if the tape position for overwriting the data is earlier (a value smaller) than the appended data end position of the tape (EOD), and updating the overwrite data position as an appended data end position in the non-volatile memory (EOD in the non-volatile memory) if the tape position for overwriting the data is later (a value greater) than the appended data end position of the tape (EOD).

In another embodiment, the tape recording device includes a buffer for temporarily storing data related to reading and append writing, a tape for recording the data stored in the buffer, a read/write head for reading the data from the tape into the buffer and writing the data from the buffer onto the tape, and controller for reading data from a specified position of the tape and storing the data in the buffer in response to a read command and for writing the data stored in the buffer from the tape in response to an append write command and which performs operations of position movement, reading, and writing on the tape medium back and forth in a longitudinal direction of the tape medium, when a single tape cartridge having the tape medium is loaded in the tape recording device and the tape recording device receives a series of commands including mixed read (Read), overwrite, and append write (Write) commands from a higher-level device (each moving to a tape position specified by a moving command, i.e., Position) where the plurality of read commands includes first, second, . . . m-th, n-th . . . (m, n=m+1) read commands in this order. In this method, the tape recording device and/or the tape cartridge is provided with a non-volatile memory for storing the data stored in the buffer in response to a write command.

In yet another general embodiment, a computer program product for writing into a tape recording device causes a computer to perform the steps of: (a) upon receipt of the append write command, storing the data stored in the buffer in an appended data end position in the non-volatile memory (EOD in the non-volatile memory); (b) sending back a completion notification of the append write (synchronization) command to the higher-level device when the data in the buffer is written in the non-volatile memory; (c) moving the data temporarily stored in the non-volatile memory and then moving to a tape writing position (EOD) where the data temporarily stored in the non-volatile memory is to be written to perform writing on the basis of a predetermined criterion so as to minimize a moving distance by which the tape travels relative to the head, when moving from an end position on the tape of read data for the m-th read command to a reading start position for the subsequent n-th read command; and (d) when receiving an overwrite (Over Write) command of data in a predetermined position on the tape between the mixed commands in the series of commands wherein the overwrite command causes the end of the written data to be in a data end position (EOD), updating the overwrite data position as an appended data end position (EOD) if the tape position for overwriting the data is earlier (a value smaller) than the appended data end position of the tape (EOD), and updating the overwrite data position as an appended data end position in the non-volatile memory (EOD in the non-volatile memory) if the tape position for overwriting the data is later (a value greater) than the appended data end position of the tape (EOD).

In one embodiment, a method for writing data in a tape recording apparatus includes receiving a series of commands, the series of commands including mixed read, overwrite, and append write commands. Data is read from a specified position of the tape using a head and the data is stored in a buffer in response to a read command. Data stored in the buffer is written starting from an appended data end position of the tape in response to an append write command.

According to another embodiment, a method for writing data in a tape recording apparatus includes, in response to receipt of an append write command, storing data stored in a buffer to a non-volatile memory starting from an appended data end position. A completion notification of the append write command is sent to a higher-level device when data in the buffer is written in the non-volatile memory. The tape is moved to a tape writing position where the data stored in the non-volatile memory is to be written. An append writing is performed on a basis of a predetermined criterion so as to minimize a moving distance by which a tape travels relative to a head, when moving from an end position on the tape of read data for a m-th read command to a reading start position for a subsequent n-th read command, wherein n=m+1.

According to one embodiment, a tape recording device is able to increase the overall performance of the mixed operations even when a higher-level device intervenes for overwriting in a series of commands including mixed read and append write commands.

BRIEF DESCRIPTION OF THE SEVERAL VIEWS OF THE DRAWINGS

FIG. 6 illustrates a table summarizing a relationship in moving distance increase or decrease between omission of a synchronization operation and a subsequent rewrite operation.

DETAILED DESCRIPTION

Hereinbelow, a description is given of an embodiment (hereinafter, referred to as "example") of a method of append writing new data when an intervention of overwriting (Over Write) in a linear recording tape drive on which a single tape cartridge is loaded and which has received a series of commands including mixed read and append write (Append Write) commands from a host. This example is illustrative only and is not intended to limit a tape recording device for append writing in any way.

It is conceived that a total tape moving distance and duration with respect to a read/write head are reduced in mixed append write and read operations of a tape drive with a single tape cartridge (cartridge) loaded thereon. Accordingly, a summary of the example is given so that the following particular matters are performed.

1. When there arises a need for a synchronization operation (writing in the tape) of data written in a buffer, the data to be flushed is written in a temporary non-volatile storage area.

2. As the temporary storage area, used is an area where no movement in the tape is required or where the total tape moving distance and duration is made less than those for recording in an originally intended area. In addition, writing time is equal to or shorter than normal writing time.

3. The temporarily stored data is rewritten later in the originally intended recording position. Normally, the data is left in the buffer, and rereading from the temporary storage area is not required in the rewriting.

4. The rewrite operation is performed as a moving operation in a subsequent process.

5. If data in the buffer is lost due to accidental powering-off, the data is read from the temporary non-volatile storage area as processing of recovery from an error, and then is written in the originally intended recording position.

Figure 1:
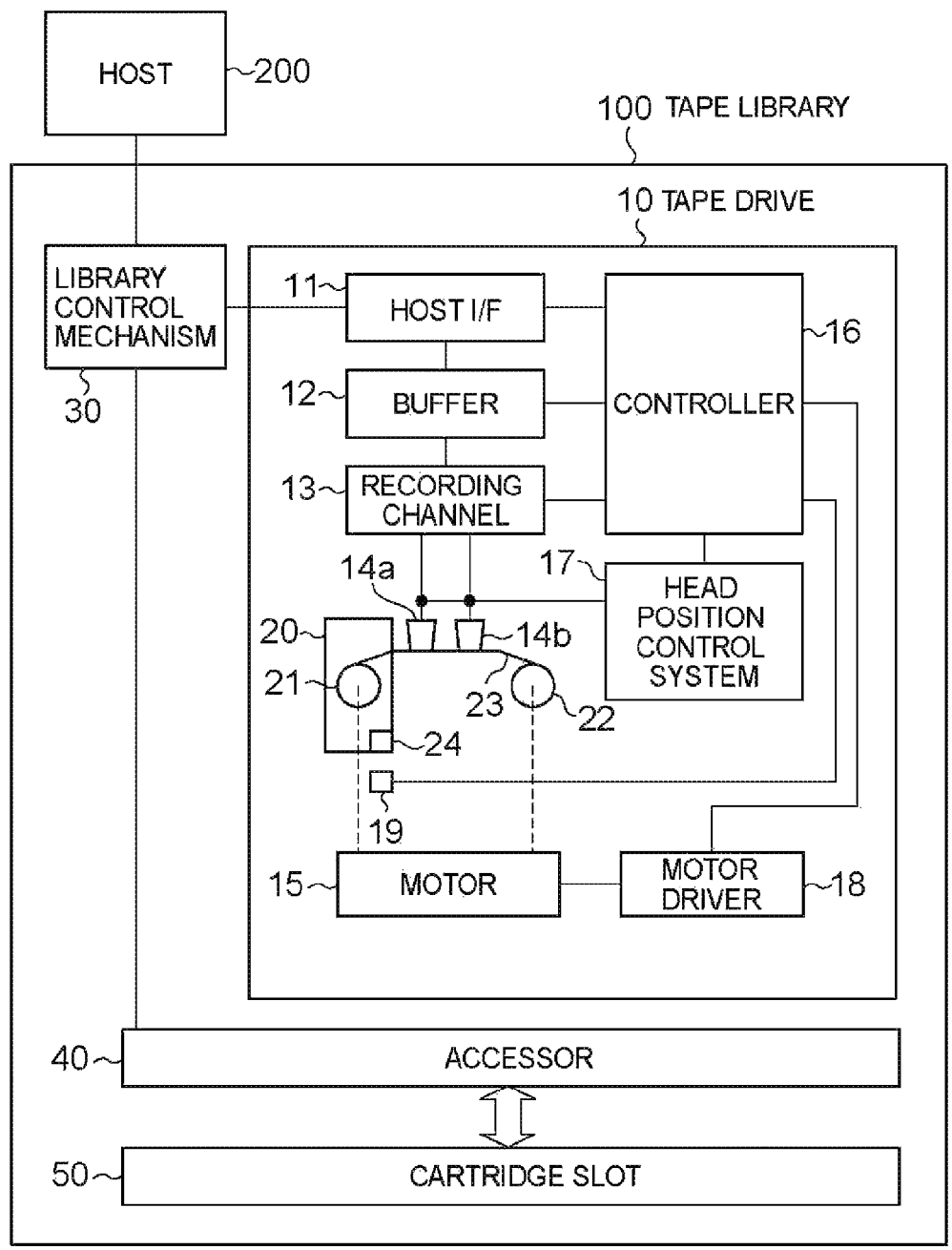
FIG. 1 is a diagram illustrating a configuration example of a tape library including a tape drive according to one embodiment.

First, a description is given of a tape drive and a tape library including the tape drive, to which this embodiment is applied. FIG. 1 is a diagram illustrating a configuration example of a tape library 100 including the tape drive, to which this embodiment is applied. As illustrated in FIG. 1, the tape library 100 includes a tape drive 10, a library control mechanism 30, an accessor 40, and a cartridge slot 50. Among them, the tape drive 10 includes a host interface (hereinafter, referred to as "host I/F") 11, a buffer 12, a channel 13, a write head 14a, a read head 14b, and a motor 15, and also includes a controller 16, a head position control system 17, and a motor driver 18. Furthermore, a tape cartridge (hereinafter, simply referred to as "cartridge") 20 is also illustrated, since the cartridge 20 is loadable in the tape drive 10 by being inserted into the tape drive 10. The cartridge 20 includes a tape 23 wound around reels 21 and 22. With the rotation of the reels 21 and 22, the tape 23 is moved in a longitudinal direction thereof, from the reel 21 to the reel 22, or from the reel 22 to the reel 21. A magnetic tape is exemplified as the tape 23, but a tape medium other than the magnetic tape may be used.

The cartridge 20 also includes a cartridge memory 24. The cartridge memory 24 records information of, for example, how data is written in the tape 23. The indices of the data written in the tape 23 and a use status of the tape 23 are checked in a non-contact manner by using, for example, an RF interface, thereby enabling high-speed access to the data. In FIG. 1, an interface, like the RF interface, for accessing the cartridge memory 24 is shown as a cartridge memory interface (hereinafter, referred to as "CMI/F") 19.

Meanwhile, the host I/F 11 communicates with a host 200. For example, from the host 200, the host I/F 11 receives a command for writing data in the tape 23, a command for moving the tape 23 to a target position, and a command for reading data from the tape 23. Incidentally, SCSI is exemplified as a communication standard used for the host I/F 11. In SCSI, a first command corresponds to a Write command, a second command corresponds to a Locate command or a Space command, for a tape moving operation; and a third command corresponds to a Read command. The host I/F 11 responds to the host 200, whether or not processing in response to a corresponding one of the commands succeeds or fails.

Data buffered in the buffer 12 is written in the tape 23 by a synchronization operation (Flush). The synchronization after Write is explicitly specified by a command (such as a Write Filemark command), or implicitly specified by a command (such as a Locate, Space, Rewind or Unload command for moving the position). Moreover, depending on an option of the Write command itself, the Write command itself might not be completed until the synchronization is completed.

The buffer 12 is a memory in which data to be written into the tape 23 and data read from the tape 23 is accumulated. For example, the buffer 12 comprises a Dynamic Random Access Memory (DRAM). Further, the buffer 12 is formed of a plurality of buffer segments, and each buffer segment stores a dataset which is a unit of reading from and writing in the tape 23. The channel 13 is a communication channel used for transmitting data to be written in the tape 23 to the write head 14a and for receiving data, which has been read from the tape 23, from the read head 14b. When the tape 23 moves in the longitudinal direction, the write head 14a writes information in the tape 23, while the read head 14b reads information from the tape 23. The motor 15 rotates the reels 21 and 22. Although the motor 15 is shown by a single rectangle in FIG. 1, it is preferable to provide one motor 15 for each of the reels 21 and 22, namely two motors 15 in total.

The controller 16 controls the entire tape drive 10. For example, the controller 16 controls writing or reading data to or from the tape 23 in accordance with a command received by the host I/F 11. The controller 16 also controls the head position control system 17 and the motor driver 18. The head position control system 17 is a system which controls the write head 14a and the read head 14b to track on a desired wrap. The wrap is a group of a plurality of tracks on the tape 23. When there arises a need for moving to a different wrap, electrical switching of the write head 14a or the read head 14b is also required. Therefore, the head position control system 17 controls such switching. The motor driver 18 drives the motor 15. When the two motors 15 are provided as described above, two motor drivers 18 should be provided, too.

Meanwhile, the library control mechanism 30 is a mechanism which controls the accessor 40 and the tape drive 10 in response to an instruction from the host 200. Specifically, the library control mechanism 30 instructs the accessor 40 to load the cartridge 20 in the tape drive 10 so that data designated by the host 200 is able to be read or written, and instructs the tape drive 10 to read the data designated by the host 200 from or to write the data onto the cartridge 20 loaded by the accessor 40. The accessor 40 takes the cartridge 20 out of the cartridge slot 50 to load the cartridge 20 in the tape drive 10 in accordance with the control of the library control mechanism 30. The cartridge slot 50 is a space for storing a cartridge 20 in which no data is read or written. Here, the cartridge slot 50 is shown by a single rectangle, but, actually, there are provided a plurality of slots for storing a plurality of cartridges, respectively.

Note that only one tape drive 10 is shown in FIG. 1, but a plurality of tape drives 10 may be provided. In the latter case, the library control mechanism 30 notifies the accessor 40 of identification information of one of the tape drives 10 to which a read or write command is to be transmitted, and thereby instructs the accessor 40 to load a cartridge 20 in the tape drive 10.

Figure 2:
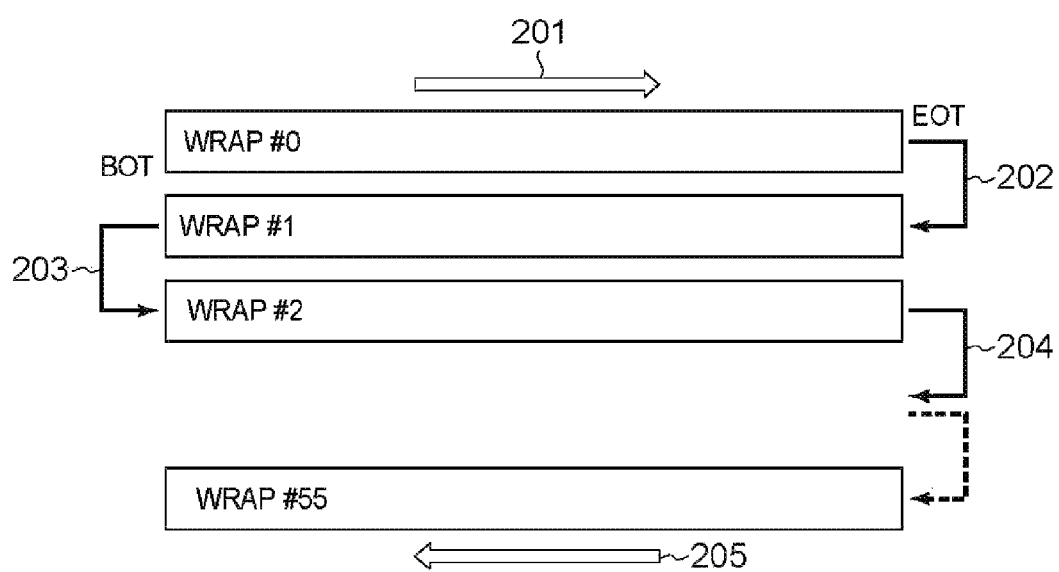
FIG. 2 illustrates normal operations of moving, reading, and writing performed on a tape of a tape drive, according to one embodiment.

FIG. 2 illustrates operations of normal position movement of data (Position command), reading (Read command), and append writing (Write command) which are performed in the tape 23 of a tape drive. The tape drive may be a linear recording enterprise tape product (TSxx series by IBM Corp.) or one in compliance with Liner Tape-Open (LTO). First, data reading and writing are performed on a wrap #0 in the right direction as shown by an arrow 201, and then the travelling direction of the tape 23 is reversed as shown by an arrow 202. Subsequently, data reading and writing are performed on a wrap #1 in the left direction, and then the travelling direction of the tape 23 is reversed as shown by an arrow 203. Furthermore, data reading and writing are performed on a wrap #2 in the right direction, and then the travelling direction of the tape 23 is reversed as shown by an arrow 204. In the last step, data reading and writing are performed on a wrap #55 in the left direction as shown by an arrow 205.

As described above, in the linear recording tape drive, the data reading and writing are performed in data storage areas called wraps defined in the tape 23, while the read/write head reciprocates between the beginning of the tape 23 (BOT) and the end of the tape (EOT). The wrap is a set of a plurality of tracks arranged in parallel with each other and spaced away from each other in a width direction of a tape. Each of the write head 14a and the read head 14b may include a plurality of channels (eight or 16 read/write elements). The write head 14a and the read head 14b enable the operations of moving, reading, and writing to be performed on the plurality of tracks in parallel in the same wrap. In the case of serial reading/writing, the read/write head reciprocates in the wraps. Note that the beginning of the tape 23 is an example of a first end portion and the end of the tape 23 is an example of a second end portion.

Meanwhile, through a HSM system, the tape library 100 located in the lowest layer receives a series of commands for mixed read/write operations from the host 200. The following provides an example of enhancing the performance in operation processing of the entire series of commands in the case where a single tape drive receives such a series of commands for the mixed read/write operations. In this embodiment, the total tape moving distance and duration is reduced when a tape drive performs mixed operations of append writing and reading on a single tape cartridge loaded in the tape drive.

Before describing the example, a description is given of how much a synchronization operation increases a moving distance in the mixed read/write operations. Then, an example is provided in which enhancement of the overall performance is exerted by substantially omitting the moving distance involved with the synchronization operation. First, as a premise of description of the example, an example below should be understood in which conventional mixed read and write operations involve an unnecessary moving distance.

Figure 3:
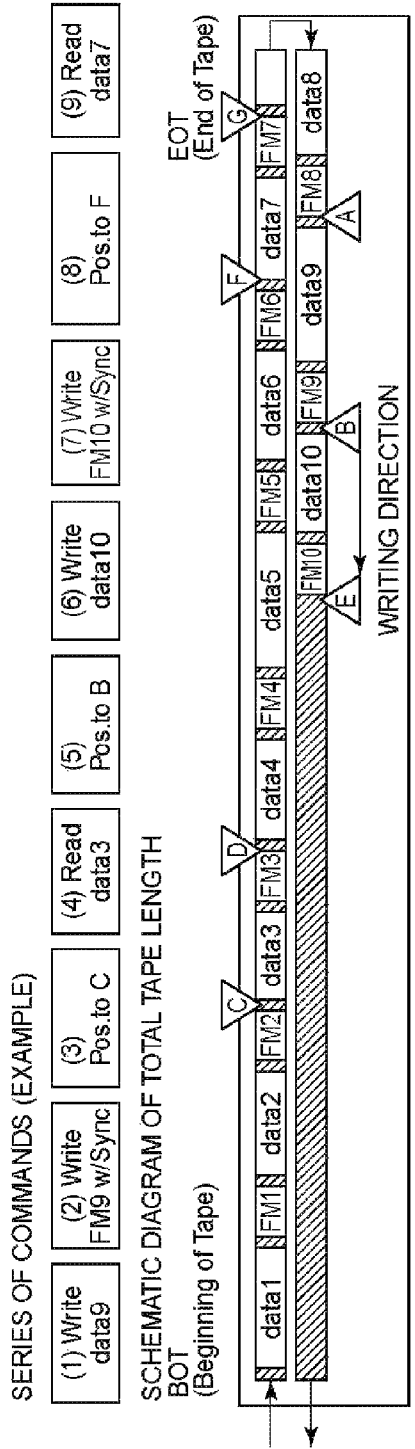
FIG. 3 illustrates an example of conventional mixed read and write operations.

FIG. 3 illustrates the example of the conventional mixed read/write operations. A description is given of an example of receiving a series of commands including mixed Read and Write commands when a tape is traveled linearly relative to tracks such as from right to left or left to right. As shown in the following series of commands (1) to (9), movement is performed after a write (append write) operation (Write) to perform a read operation (Read), and further, a write operation (Write) is performed:

(1) Write data9→(2) Write FM9 w/Sync (Synchronization [Flush] is performed simultaneously with writing FileMarker9)→(3) Position tape to position C (a command for moving to a position C)→(4) Read data3→(5) Position tape to position B→(6) Write data10→(7) Write FM10 w/Sync→(8) Position tape to position F→(9) Read data7

Operations of the tape drive are performed as described below. User data is represented by data1 to data10 and FileMarkers (FM) as the delimiters of data are represented by FM1 to FM10.

1. At position A, data9 is buffered in a buffer ((1)).
2. After data9 is written from the buffer as a synchronization operation, FM9 is written ((2)). The writing of data9 and FM9 results in movement from the position A to position B.
3. The tape moves from position B to position C ((3)).
4. Data3 is read ((4)). The reading of data3 results in movement of the tape from position C to position D.
5. The tape moves from position D to position B ((5)).
6. Data10 is buffered in the buffer ((6)).
7. After data10 is written as a synchronization operation, FM10 is written ((7)).
The tape moves from position B to position E.
8. The tape moves from position E to position F ((8)).
9. Data7 is read. The tape moves from position F to position G ((9)).

As shown in FIG. 3 (in a lower part of FIG. 3) the total tape length is schematically shown, and the above series of operations results in a moving distance of the tape as indicated by the positions A→B→C→D→B→E→F→G. A synchronization operation (for example, Flush by a Sync command) and a moving operation (the Position command) always occur between a write operation and a read operation, in one approach. The mixed operations involve a long tape moving distance. The mixed operations in this case result in an increase by an overlapping section (B→E) resulting from the synchronization operation and subsequent halfway moving to the target position F. Specifically, in the conventional operations, there arises a problem that the moving operation requires a duration increased by this increase amount. Therefore, a study has been made on whether the synchronization operation and the subsequent overlapping section can be omitted.

Figure 4:
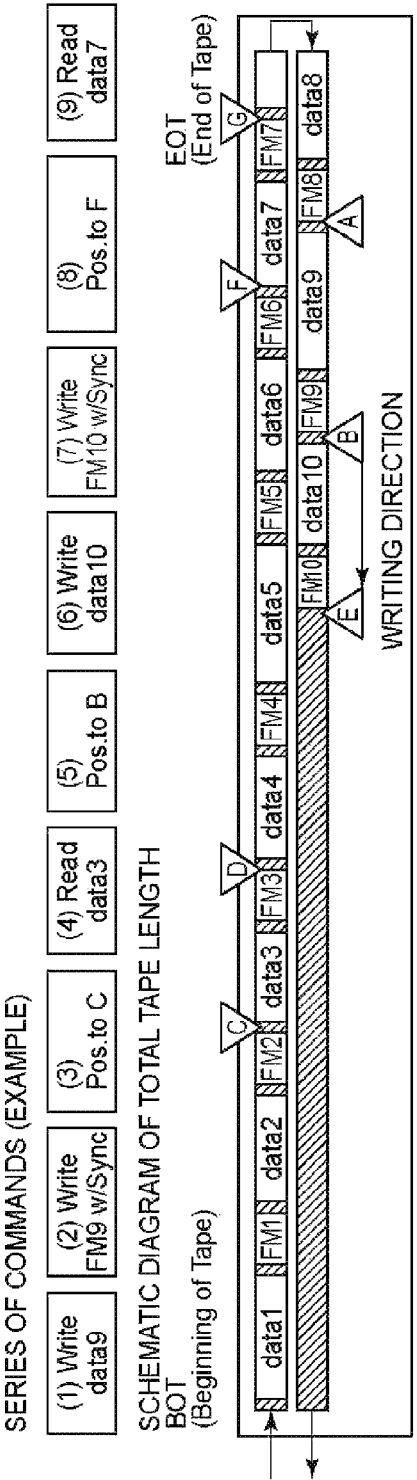
FIG. 4 illustrates that omission of a synchronization operation results in reduction in tape moving distance.

FIG. 4 shows that omission of a synchronization operation enables reduction in a tape moving distance. By omitting the writing into a tape medium in response to a synchronization command in the same series of commands ((1) to (9)) from the conventional operations (FIG. 3), the moving distance is able to be reduced. The following is the operations of the tape drive in accordance with the same series of commands as in the previous page, in accordance with FIG. 4:

1. At position A, data9 is buffered in a buffer ((1)).
2. After data9 is written from the buffer as a synchronization operation, FM9 is written ((2)). The tape moves from position A to position B.
3. The tape moves from position B to position C ((3)).
4. Data3 is read ((4)). The tape moves from position C to position D.
5. Moving the tape from the position D to position B ((5)) is omitted.
6. Data10 is buffered in the buffer ((6)).
7. A synchronization operation on data10 and FM10 ((7)) is omitted, and data10 is maintained buffered in the buffer ((6)).
8. The tape moves from position D to position F ((8)).
9. Data7 is read ((9)). The tape moves from position F to position G. The moving distance is represented by the positions A→B→C→D→F→G. The aforementioned example including the synchronization operations has three moving operations (D→B→E→F), while this example has only one moving operation for moving the tape from position D to position F, thereby reducing the moving distance. Specifically, the moving distance is reduced in the following three operations as compared to the case shown in FIG. 3.

Moving operation from position D to position B in accordance with the fifth command;
A synchronized write operation of data10 and FM10 involving movement of the tape from position B to position E, in accordance with the seventh command; and
A moving operation from position E to position F in accordance with the eighth command.

At the time that a completion notification is sent in response to the synchronization command, however, it is necessary that data is properly written in the medium and future access is ensured. The synchronization operation is substantially ensured for the host in one approach. In addition, the following example discloses a write-once method which suppresses an increase in a moving distance of a series of commands including mixed Read and Write commands by placing Writes strategically.

The following configuration is discussed in accordance with one embodiment in order to ensure a synchronization operation for the host with respect to data stored in the buffer:
1. A tape cartridge or a tape drive is provided with a new temporary non-volatile storage area. The provision of the non-volatile storage area gives the tape cartridge or the tape drive an access characteristic that reduces the synchronization operation. Examples of the non-volatile storage area include a non-volatile memory such as a flash memory attached to the cartridge and/or the drive, a special storage area in a tape medium, and the like.
2. In the tape drive, appended data is temporarily stored in the non-volatile storage area to delay an append write operation in the tape to the originally intended end of write data, such as physical end of data (EOD) on the tape. Separately, at a convenient time, a rewrite operation is started at the originally intended end of data (EOD) on the tape.
(1) The non-volatile storage area is used to ensure that data may always be read from the tape cartridge (or the tape drive) after sending back a completion notification of processing in response to a synchronization request from the host. (2) The non-volatile storage area is hidden from the host. Specifically, when a read operation occurs after a write operation, data is read from the non-volatile storage area as if the data were written at the originally intended position.

By being provided with a new non-volatile storage area, the tape drive receives a series of commands including mixed Read and Write transmitted from the host. Generally, Read is often performed after a reading position is specified. Similarly, Write for append writing is performed after a writing position is designated as the EOD. The reading position and the writing position, however, often are not related to each other. If a write operation (substantial synchronization operation) at a target position (physical EOD) on the tape can be executed in the course of moving between read operations, as append writing, an unnecessary tape moving distance is able to be reduced. If a writing position (physical EOD) on the tape for writing data stored in the non-volatile storage area exists between any two of a plurality of moving positions for subsequent Read operations, the writing in the tape during the moving increases the overall performance of the series of commands.

1. In the example, in accordance with a synchronization operation subsequent to an append write command (Write), data stored in the buffer is stored in a non-volatile storage area.
2. It is necessary to perform an operation in which the data temporarily stored in the non-volatile storage area is written at an originally intended position on a tape (end of data (EOD)).

A moving distance in the rewrite operation has a converse relation with a moving distance in the writing and synchronization operations. This means that a distance reduced by the omission of the synchronization operation is equal to a moving distance increased by the rewrite operation. Data is rewritten in a case where the moving distance or duration can be made less than those in the conventional operations. For example, if a position (EOD) to be rewritten (to be append written) is to be passed through during moving operations for a plurality of Read commands, data is able to be rewritten without moving exclusively for the rewritten operation.

In order to ensure data storing for the synchronization operation, it is useful to prevent a state in which there is no free space in the temporary storage area in one approach. When a synchronization command is received, a free space (unused ratio) in the non-volatile storage area might be reduced, depending on a moving distance for rewriting and temporarily stored data volume. When the non-volatile storage area is completely full, data in the non-volatile storage area is unconditionally rewritten from the EOD of the tape. After the rewrite operation, a normal write operation is subsequently performed on the tape. In addition, when the Rewind command or the Unload command for the cartridge is received, the rewrite operation is performed unconditionally, because Rewind and Unload mean that the tape cartridge is used up.

Figure 5:
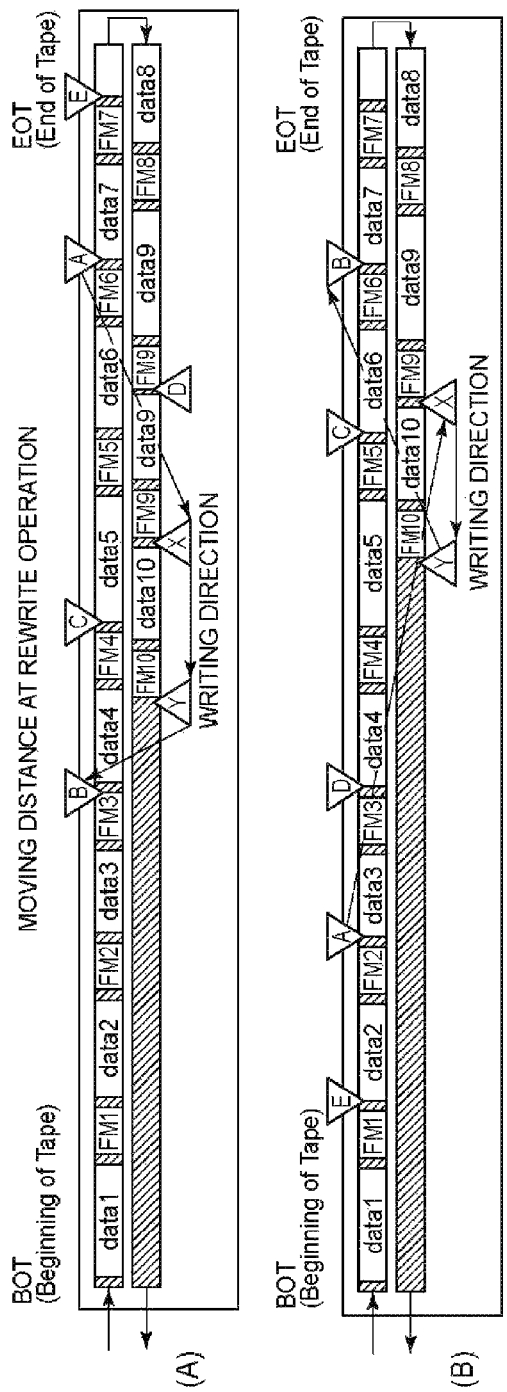
FIG. 5 illustrates reduction in moving distance resulting from omission of write and synchronization operations in one embodiment.

FIG. 5 illustrates a moving distance at the time of an append rewrite operation in which a substantial synchronization operation is ensured by using the non-volatile storage area. FIG. 5 illustrates increase and decrease of the moving distance caused by omission of the synchronization operation and the rewrite operation in the example.

- A distance in the longitudinal direction of the tape is considered.
- Rewriting is assumed to be performed during moving from the current position A to a moving target position B (C, D, E).
- Relationships among a rewriting start position X, a completion position Y, and the moving target position B (C, D, E) viewed from the current position A are classified.

1. The moving target position B is located in the same direction as the rewriting start position X and the completion position Y, and is farther from the current position A than the rewriting start position X and the completion position Y.
2. The moving target position C is located in the same direction as the rewriting start position X and the completion position Y, and is located between the rewriting start position X and the completion position Y.
3. The moving target position D is located in the same direction as the rewriting start position X and the completion position Y, and is closer to the current position A than the rewriting start position X and the completion position Y.
4. The moving target position E is located in an opposite direction to the rewriting start position X and the completion position Y with respect to the current position A.

In addition, a difference in the writing direction affects the moving direction from the position A to B (to C, D, E). There are two writing directions: the same writing direction (an upper figure of FIG. 5) as the moving direction; and an opposite writing direction (a lower figure of FIG. 5) to the moving direction.

The following describes relationships, in the above directions, between a distance as a result of the moving operation from the position A→B (C, D, E) and a moving distance from the position A→X→Y→B (C, D, E) as a result of addition of the rewrite operation.

1. In the case of the same direction, the moving distance as a result of the rewriting does not increase (1-*a*). In the case of the opposite direction, the movement of the position A→B is the same as the movement of the position A→X→B, and therefore the moving distance increases by a distance of a reciprocation between the positions X and Y (1-*b*).

2. In the case of the same direction, the distance increases by a difference between the movement of the position X→Y→C and the movement of the position X→C (2-*a*). In the case of the opposite direction, the movement of the position A→C is the same as the movement of the position A→Y→C, and therefore the moving distance increases by a distance of a reciprocation between the positions Y and X (2-*b*).

3. In the case of the same direction, the movement of the position A→X is the same as the movement of the position A→D→X, and therefore the distance increases by a distance of a movement of the position D→X→Y→D (3-*a*). In the case of the opposite direction, the movement of the position A→X is the same as the movement of the position A→D→Y→X, and therefore the moving distance increases by a distance of a movement of the position D→Y→X→Y→D (3-*b*).

4. In each of the directions, the distance increases by a distance of a movement of the position A→X→Y→A (4-*a*, 4-*b*).

By omitting the write and synchronization operations, the moving distance is made equal or reduced regardless of the moving target position after rewriting. The moving distance can be reduced in the rewrite operation when the moving distance has the converse relation with the moving distance in the synchronization operation.

FIG. 6 illustrates a table summarizing a relationship in moving distance increase or decrease between omission of the synchronization operation and the subsequent rewrite operation (the cases 1-*a* to 4-*b* in FIG. 5).

1. It was found that the moving distance reduced due to the omission of the synchronization operation on the tape medium has the converse relation with the moving distance as a result of the rewrite operation, as described with reference to FIG. 5.

2. When the ratio of the omission of the synchronization operation to occurrence of the rewrite operation is 1:1, no change occurs in the total moving distance. In one embodiment, any data stored in the buffer is stored in a non-volatile storage area (non-volatile memory) in the synchronization operation. By storing data in the non-volatile memory, a rewrite operation involving tape movement can be omitted. Then, when the movement for the rewrite operation can be omitted, the total moving distance can be reduced. The case 1-*a* is a case where the moving distance for the rewrite operation can be fully omitted. In the case 1-*a*, the rewriting position (physical EOD) on the tape is located within the moving distance between two Read commands (movement from the data end position for first Read for reading the tape to the data beginning position for second Read for reading the tape). In the case 1-*a*, the data stored in the non-volatile memory by the synchronization operation is rewritten in the tape in the course of the subsequent movement.

3. When a plurality of synchronization operations are omitted and if a rewrite operation for data stored in the non-volatile memory can be executed in the course of movement for a plurality of subsequent Read operations, the total moving distance of the series of commands including mixed Read/Write commands is always reduced In one embodiment, rewriting processing in the moving operation may be determined as follows:

Moving Pattern: Case 1-*a*

Before starting the moving operation, the execution of the rewrite operation is determined. When the moving pattern is as in the case 1-*a*, there is no increase in moving distance for the rewrite operation. That is, the increase in moving distance is zero. Thus, the rewrite operation is always performed in movement for the subsequent Read operation. Referring to FIG. 5, this is the case where the tape writing position (X→Y) is located between two tape positions (A→B).

Moving Pattern: Cases 1-*b*, 2-*a*, and 2-*b*

The rewrite operation increases a moving distance. The increase ratio depends on an originally intended moving distance, the position A→B (C, D, E), the rewriting start position X, and the position Y depending on the volume of data to be rewritten (X←→Y).

Whether or not to perform the rewriting processing is determined on the basis of the relationship to be described later between the volume of temporarily stored data and the moving distance as a result of rewriting. The rewriting (X→Y) of the data stored in the non-volatile memory is able to be performed without an increase up to halfway of the writing from the position X to Y. In the case where the distance from the position X to Y, however, does not completely overlap the moving distance between two points (A→C, D, E), the rewrite operation causes an increase in the distance. If the increase is small, rewriting of most part of data can be performed within the moving distance. Since there occurs an increase due to moving for some part of tape writing, however, there is not so much advantage of writing between Read commands in this case.

Moving Pattern: Cases 3-*a*, 3-*b*, 4-*a*, and 4-*b*

Since the moving operation for the rewrite operation largely increases the moving distance compared to the originally intended moving distance, the rewriting is not performed. This is obviously a case where positions of data (X→Y) to be written do not overlap in the course of moving for subsequent a plurality of Read commands, and thus there is no advantage for the entire series of commands.

When the append write command and the synchronization command are received, the following two operations are conceivable.

1. A moving operation is not performed, but new user data is written in the temporary storage area.
(Advantage) Since movement for the writing processing is not performed, the moving distance can be reduced.
(Disadvantage) The temporary storage area might run short during the writing.
2. Writing in the temporary storage area is not performed, but a rewrite operation is performed and then writing is performed at the originally intended position.
(Advantage) The temporary storage area can be saved.
(Disadvantage) It is necessary to move to the rewriting start position X and then to perform rewriting.

The advantage and disadvantage of each of the two operations above have a correlation with the following two points. Specifically, these two operations are determined based on the volume (use ratio) of data stored in the temporary non-volatile storage area and a moving distance from the current position to the rewriting start position. For example, in the cases of the aforementioned moving pattern 1-*b*, 2-*a*, and 2-*b*, if movement between two points for reading involves a large increase, it is chosen in principle that the rewrite operation is not performed on the tape. In addition, even if a rewrite operation between read operations involves some increase in the moving distance, reduction in distance as a result of the writing in the temporary storage area might be larger than the increase. In this case, it is possible to make a choice of executing the rewrite operation during the movement for Read.

Figure 7:
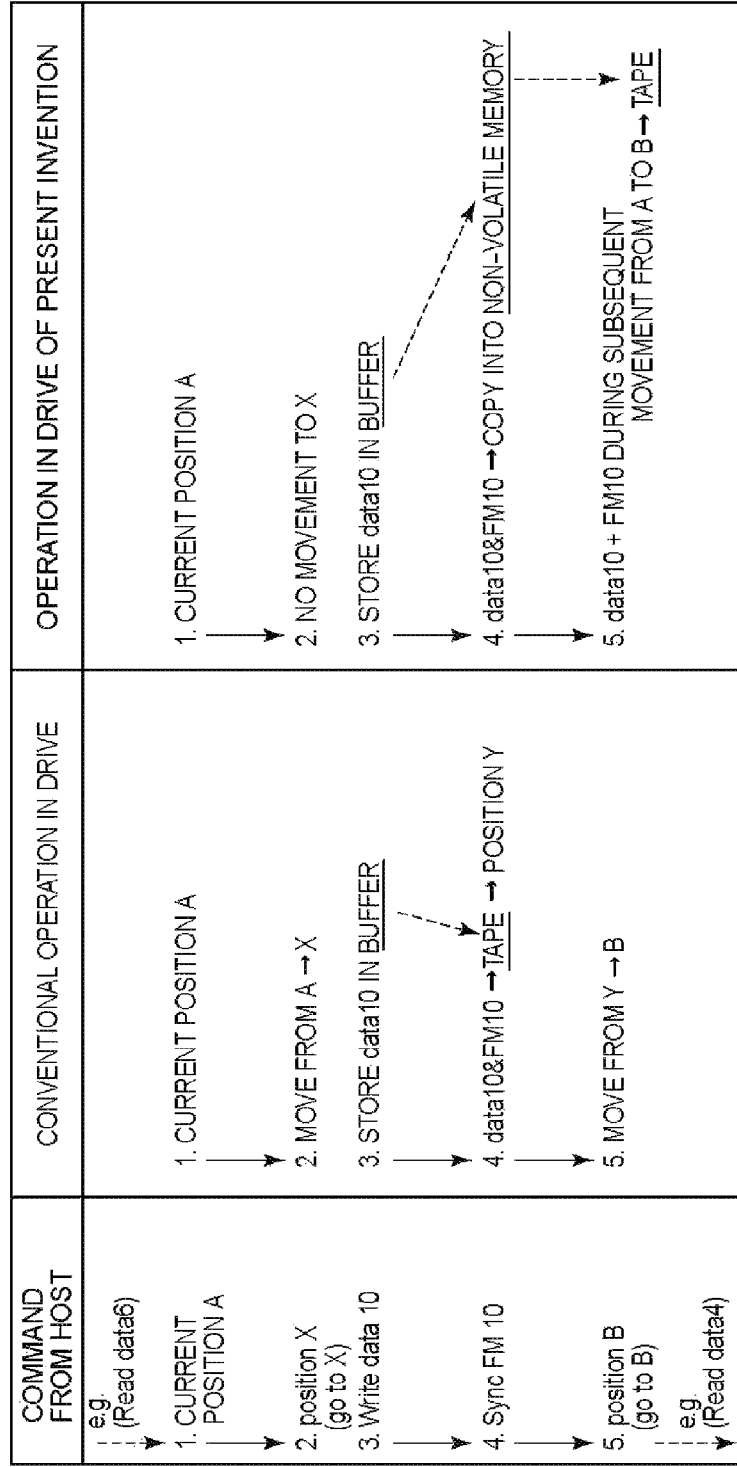
FIG. 7 illustrates that a writing position exists in a moving operation, according to one embodiment.

FIG. 7 illustrates the case 1-*a* where an EOD which is the append writing position exists in the course of movement. The data stored in the buffer is not append written in the tape, but stored in the non-volatile storage area. In the case of moving from the position A to B for Read, the course of movement includes an append tape writing position (physical EOD) for a normal synchronization operation and a distance for writing (distance X-Y). The direction (X→Y) of writing data in the tape is the same as the moving direction for Read (A→B). As described above, in the movement subsequent to a synchronization command, the append writing position (physical EOD) and the tape writing length (the volume of data) are included in the moving distance. If the Read direction matches the rewriting direction, it is advantageous to perform, during the movement, the operation of rewriting the data stored in the non-volatile storage area.

Figure 8:
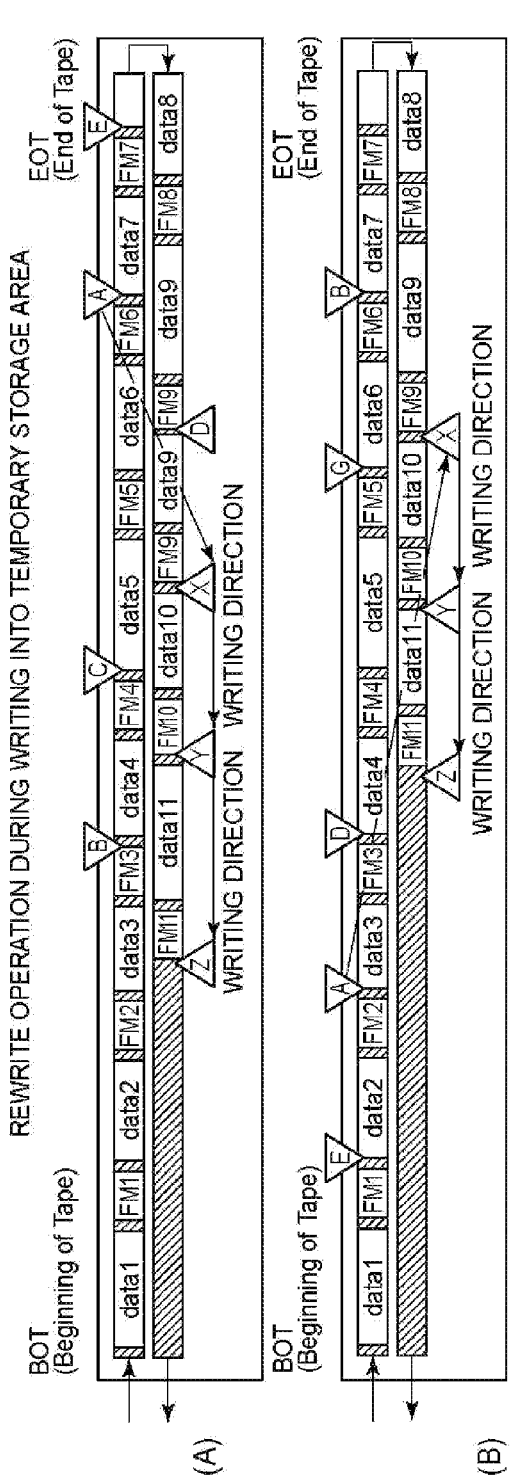
FIG. 8 illustrates modes in which data is written in a tape when there is no free space in a non-volatile storage area.

FIG. 8 illustrates modes in which data is written in the tape in the case where there is no free space in the non-volatile storage area, according to several embodiments.

In the case where the temporary storage area runs short during writing therein, the rewrite operation is unconditionally performed. Unless the rewrite operation is performed on the tape, a write operation cannot be continued because there is no free space in the non-volatile storage area. After the rewrite operation, a normal tape write operation may be performed continuously.

The followings show a difference in moving distance from the normal write and synchronization operations.

There already exists data10 and FM10 in the temporary storage area.

In the case where the temporary storage area runs short during receiving data11 anew, there is no change in moving distance if the moving direction from the current position A to the rewriting start position X is the same as the writing direction (an upper figure, case 1-*a*). If the moving direction from the current position A to the rewriting start position X is opposite to the writing direction (a lower figure, case 1-*b*), there is an increase by a distance of a reciprocation between the positions Y and X. The increase in moving distance is normally smaller than the reduction in distance as a result of writing in the temporary storage area, and therefore the append writing can be performed.

When the Rewind command or the Unload command for the cartridge is received, the rewrite operation is performed unconditionally, because Rewind and Unload mean that the tape cartridge is used up. In this state, the moving target of the position B or E is the BOT of the tape. The positions C and D (FIG. 5) cannot be the moving targets, i.e., the BOT. The corresponding moving patterns are 1-*a*, 1-*b*, 4-*a*, and 4-*b*. The rewrite operation might cause a considerable increase in moving distance. For example, the moving patterns 4-*a* and 4-*b* correspond to this case. A rewrite operation is required to ensure data custody and to use the cartridge as normal when the cartridge is remounted. The increase in moving distance is offset by the reduction in distance by writing in the temporary storage area, except for a case where the moving pattern 4-*a* is repeated in a state where the current position A is located closer to the BOT than the rewriting start position X.

Another example is provided based on the linear recording method in which position movements for Read and Write are performed back and forth in the longitudinal direction of a tape medium. Append writing in movement on the tape in the tape drive is applied to a case where data is sequentially read from or written in the tape. The example of the present invention is applied to a case of receiving a series of commands including mixed Read and Write commands from an upper-level device (host) in the case where one cartridge is loaded in the tape drive. The mixed Read and Write commands included in the series of commands issued by the host to the tape drive are executed. Hereinbelow, a description is given of a flowchart of operations for the append write command (Write), the read command (Read) and the moving command (position) assumed for Read, according to one embodiment.

Figure 9:
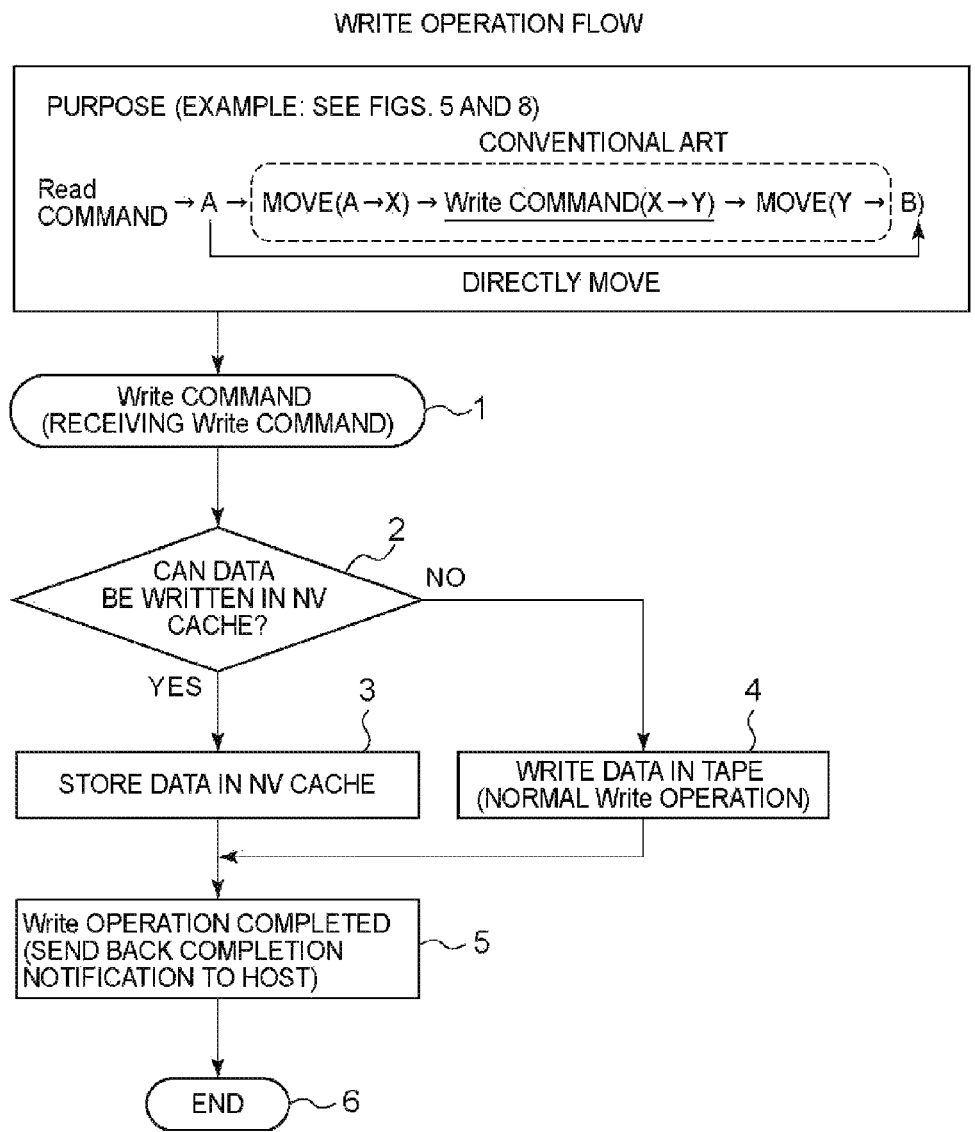
FIG. 9 illustrates an operation flow of appended data writing.

FIG. 9 illustrates an operation flow of appended data writing (Write) in one embodiment.

Figure 12:
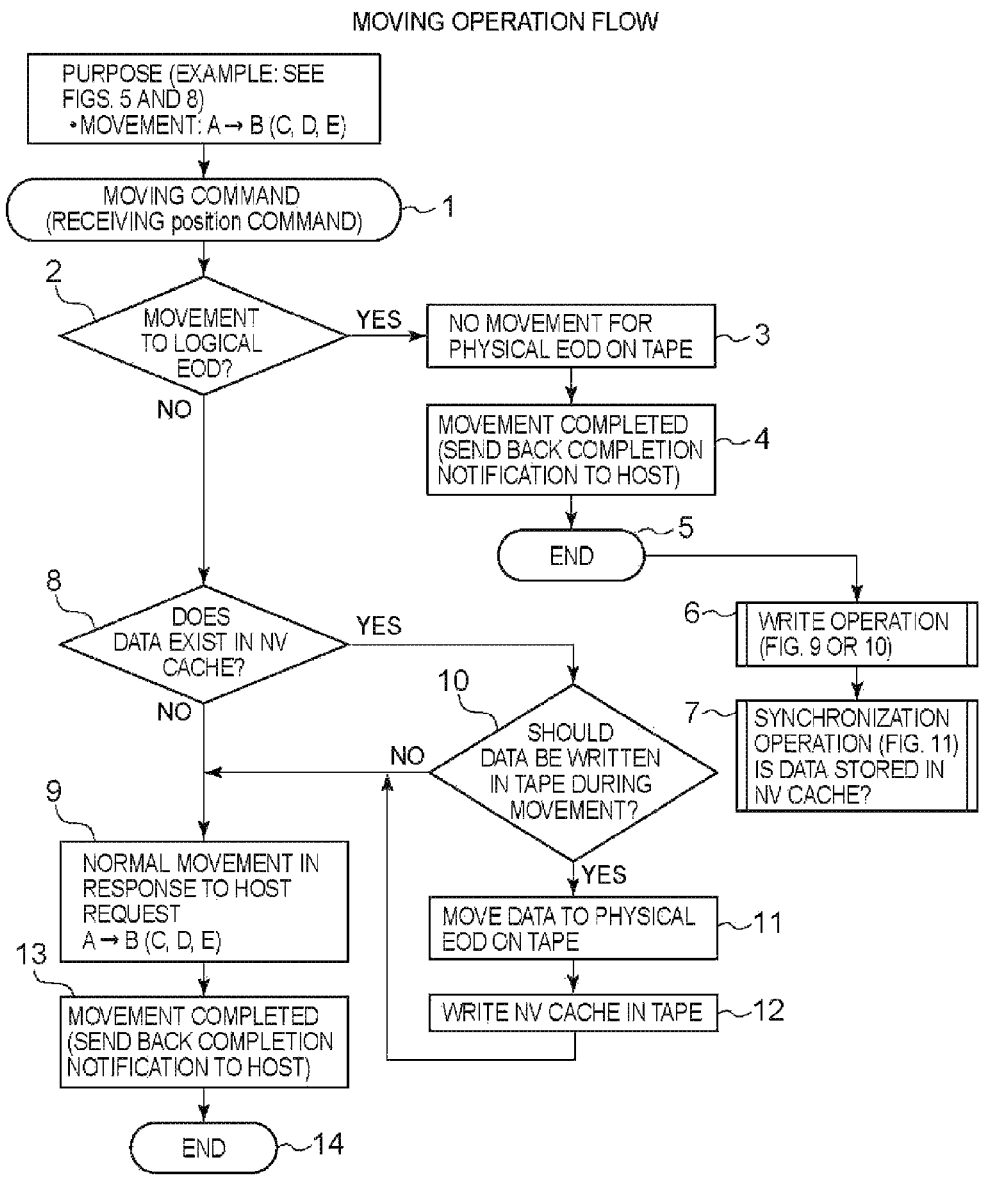
FIG. 12 illustrates an operation flow of moving between two points when a writing position exists therebetween.

1. The tape drive receives a Write command in the tape position A (FIG. 5) from the host. Data transmitted from the host, which is to be append written in the tape, is stored in the buffer. The tape position (physical EOD) in which data is to be append written in the tape is the position X (FIG. 5). After the append writing, the position Y (X→Y) is the EOD. A Position command causes the moving to the position X. The EOD after the append writing is the position Y. The movement from the position Y to, for example, the position B is performed by using a moving command (Position command). In this embodiment, it is assumed that, in the case where the current position of the tape is the position A after Read, direct movement to a target position B is performed for the next Read. Although described later, the section X-Y is located within the same wrap in this movement, and therefore data is stored in the non-volatile memory in order to append write data in the tape (FIG. 12).

2. Referring again to FIG. 9, it is checked whether the data can be written into a non-volatile (NV) cache (e.g., non-volatile memory). When there is no free space in the NV cache, writing is performed as normal.

3. When there is a free space, the data is stored in the NV cache.

4. When there is no free space, perform normal writing on the data.

5. In each of the above two cases, a completion notification of the write operation is sent back to the host upon completion of the writing.

The Write command has been described with respect to only append writing in the above. In the append writing method, the end of data (EOD) of write data in a tape is sequentially brought back by using a sequential moving method of the tape drive.

The writing method of the tape drive, however, includes Over Write in addition to the append write. The Over Write command is used to overwrite data (for example, a data set) having been written in a tape with new data by using the append write. Upon the overwrite operation, the end of the overwrite data becomes the end of data (EOD) of the tape and the subsequent write data is treated as no data.

Figure 10:
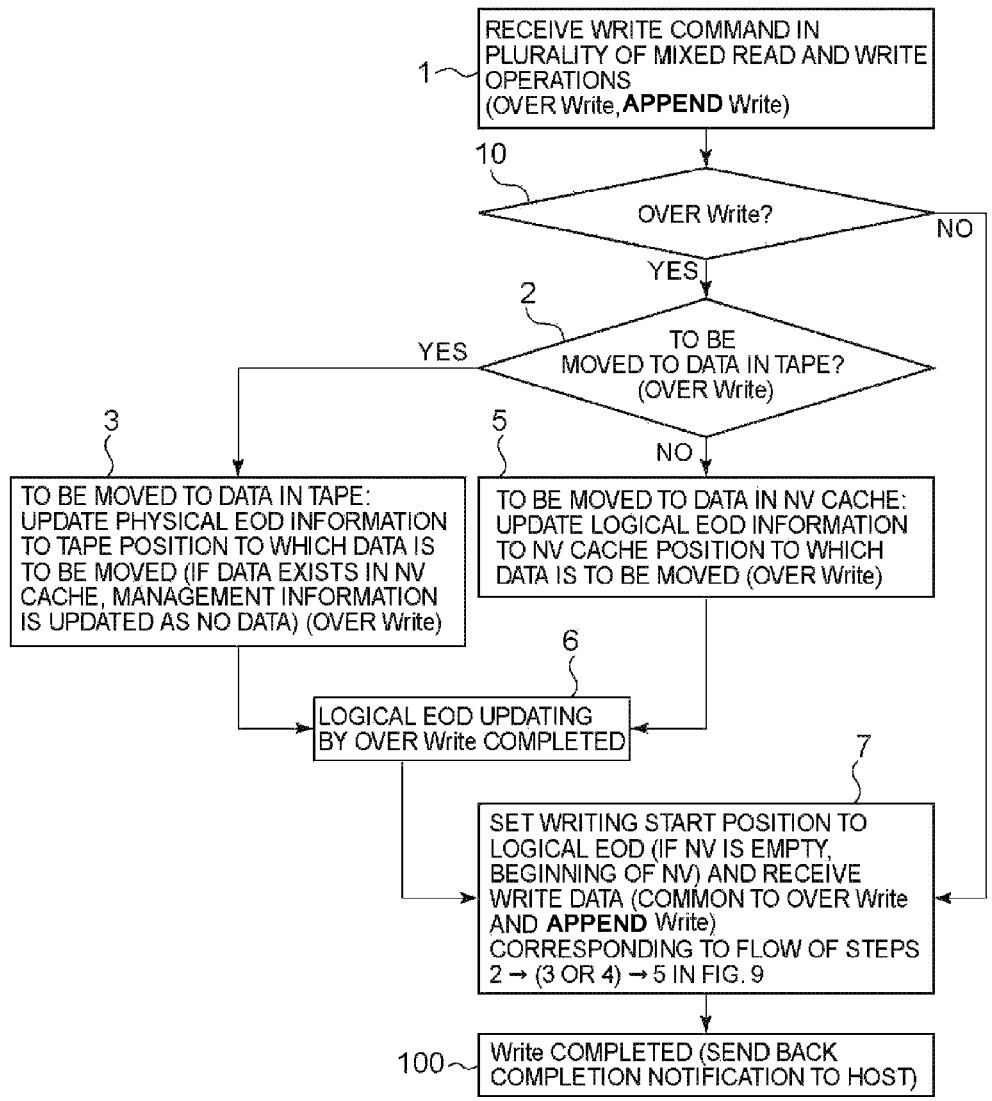
FIG. 10 illustrates a flow of receiving both of Over Write and append write commands in mixed append write and read operations.

FIG. 10 illustrates a flow of receiving both of the Over Write and append write commands in mixed append write and read operations. The following describes each of the steps 1 to 100 in FIG. 10:

1. The tape drive receives a write command (Write) in the mixed read and write operations. Most of the write commands received during the mixed operations are likely to be append write commands. In one embodiment, it is also assumed that the tape drive receives an Over Write command in the mixed operations.

10. The tape drive checks whether the received write command is an Over Write or append write command. When the command is append write, append writing (corresponding to steps 2 to 5 in FIG. 9) is performed in step 7.

2. When the tape drive receives the Over Write command, the processing proceeds to step 3 or 5.

3. This step is provided for a case where the tape drive receives the Over Write command and data in the tape is to be overwritten.

The end of data which is in the tape physical position specified for data writing by the Over Write command is updated and stored as the end of data (EOD) to be append written in the tape. At this point, data is not written in the specified tape physical position. In the subsequent step 7, data is temporarily stored in the non-volatile memory (NV cache). Finally, at an optimum time (steps 10→11→12 in FIG. 12) during a subsequent moving operation, the data stored in the NV cache is written in the specified physical position of the tape. In the Over Write method, the data after the EOD in the tape is treated as invalid (in other words, empty). Furthermore, data is treated as invalid, also with respect to data which is to be used for the append write command received before the Over Write command and which is temporarily stored in the NV cache but not yet moved to the tape. The EOD is temporarily stored in a non-volatile memory such as an NV cache, a cartridge memory (CM: a non-volatile memory in the tape cartridge), or a data set (data in the tape).

5. This step is provided for a case where the tape drive receives the Over Write command and data in the NV cache is to be overwritten.

In some cases, there is data which is to be used for the append write command received before the Over Write command and which is temporarily stored in the NV cache but not yet moved to the tape. The data in the NV cache is overwritten. The end of the overwrite data in the cache is considered as the end of appended data in the cache (EOD in the cache) and the end of data is updated and stored in the non-volatile memory. The data after the EOD in the NV cache is treated as invalid (in other words, empty). Finally, data up to the updated EOD in the cache is written from the end of appended data (EOD) in the tape at an optimum time (steps 10→11→12 in FIG. 12) during the subsequent moving operation.

6. As a result of the overwriting, the end of appended data in the tape (EOD in the tape) and the end of appended data in the NV cache (EOD in the cache) are stored as logical EODs. The higher-level device (host) does not recognize whether the appended data exists in the NV cache or in the tape.

7. This step is common to both the Over Write and append write commands. As has already been described with reference to the flow of append write (FIG. 9), this step corresponds to the flow of steps 2→(3 or 4)→5 in FIG. 9. In this embodiment, in step 3 of FIG. 9, data for the Over Write command is temporarily stored in the NV cache. Unless the data can be stored in the NV cache, the same processing as for step 4 in FIG. 9 is performed.

100: If the overwrite data is stored in the NV cache, a completion notification of the write operation is sent back to the host.

Figure 11:
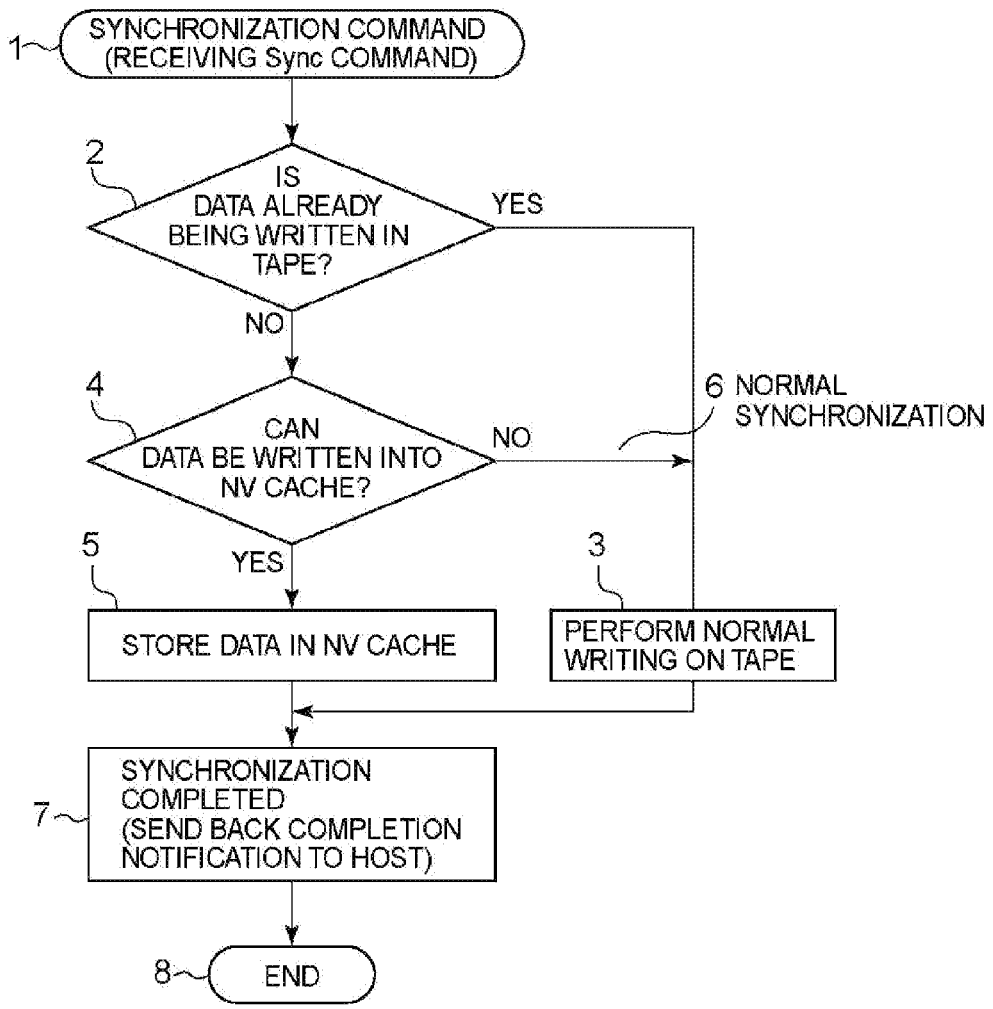
FIG. 11 illustrates an operation flow of synchronization.

FIG. 11 illustrates an operation flow of a synchronization (Sync) command.

1. The tape drive receives a synchronization command (Sync) from the host. Alternatively, the Write command may involve a synchronization operation. Further, the tape drive may receive a synchronization request implicitly specified by a position moving command in a state where data remains in the buffer as a result of a Write command.

2. It is checked whether data is already being written in the tape.

3. If data is being written, the normal append writing is performed on the tape through the normal synchronization processing.

4. If data is not being written, it is checked whether data can be written in the NV cache. In other words, the check is made by determining whether there is the following area.

5. If there is a free space in the NV cache, the data is stored in the NV cache, and then a completion notification of the synchronization is sent back to the host (8).

6. If there is no free space in the NV cache, the normal writing is performed (3) and then a completion notification of the synchronization is sent back to the host (8).

FIG. 12 illustrates a flow of a moving operation in the case where a writing position exists in the movement between two positions.

1. A moving command is received from the host.

2. Is it a movement to a logical EOD?

A logical EOD is a position where data writing is completed as an EOD for the host and the tape drive notifies the host of the position. A physical EOD is an internal end of data of the drive. The physical EOD is a position in which the drive completes data writing on the tape. In a state where data is written in the non-volatile memory, there are two physical EODs of "an EOD on the tape" and "an EOD in the non-volatile memory." In a state where data is not written in the non-volatile memory, there is only one physical EOD of "an EOD on the tape." The logical EOD in this case corresponds to the EOD on the tape.

3. If the current position is the EOD (the EOD on the tape or the EOD in the NV cache), there is no need to move. A completion notification of the movement is sent back to the host (4). The Write flow (6, FIG. 9 or FIG. 10) and then the synchronization command flow (7, FIG. 11) are executed.

8. If the current position is not the logical EOD (2), it is checked whether data exists in the NV cache.

9. If data does not exist in the NV cache, a moving command (A→B) for Read transmitted from the host is executed. Then, a completion notification of the movement is sent back to the host (13).

10. If data exists in the NV cache, it is determined whether writing should be performed during movement. For example, if an EOD for data writing exists on the way during movement, the writing is determined to be executed.

11. If the data should be written, the data in the NV cache is rewritten in the tape from the EOD on the tape (12).

12. Normal movement is performed (9). If it is determined in step 10 that the data should not be written during movement, simply movement (A→B) is performed (9). Then, a completion notification of the movement is sent back to the host (13).

The above example has been described with respect to the movement between Read commands in the series of commands including mixed Write and Read commands. The scope of the present invention is not limited to this example, and is provided on the assumption that the completion of a synchronization operation is ensured in writing in a non-volatile storage area. The scope of the present invention includes substantial tape writing of data stored in the non-volatile storage area if there is a chance of subsequently encountering a target tape position in a subsequent movement on the tape. Generally in a hierarchical storage management system, a lowest-layer tape library receives a series of commands including mixed Read and Write commands. The tape drive with one cartridge loaded thereon has many chances in which tape writing positions for the write and synchronization commands overlap in movement for subsequent Read commands. As long as a new non-volatile storage area is provided in the tape drive or the cartridge and a predetermined capacity thereof (for example, 100 Mbytes or more) is secured, it is possible to guarantee the performance of the operation of the series of commands as a whole by deferring append writing in the tape.

As described above, the library system in various embodiments exerts an advantageous effect of avoiding a replacement by unloading and loading of a cartridge exclusively for writing or reading. The system in various embodiments has an advantageous effect of achieving the speed-up as a whole even in the case where an overwrite operation is included in mixed read and write operations by minimizing the moving operation involved with data writing.

The invention claimed is:

1. An apparatus, comprising:
   a head;
   a controller coupled to the head,
   logic integrated with the controller executable by the controller, or integrated with and executable by the controller, the logic being configured to:
      receive a series of commands, the series of commands including mixed read, overwrite, and append write commands;
      cause reading of data from a specified position of a tape using the head and storing the data in a buffer in response to a read command; and
      cause writing of data stored in the buffer starting from an appended data end position of the tape in response to an append write command.

2. The apparatus as recited in claim 1, wherein the logic is configured to cause performance of operations of position movement, reading, and writing on the tape back and forth in a longitudinal direction of the tape.

3. The apparatus as recited in claim 1, wherein the buffer is configured to temporarily store data related to reading and append writing, and wherein a read/write head is configured to read data from the tape into the buffer and write data from the buffer onto the tape.

4. The apparatus as recited in claim 3, wherein the logic is configured to:
   cause, upon receipt of the append write command, storing of the data stored in the buffer in a non-volatile memory starting from an appended data end position;
   send a completion notification of the append write command to a higher-level device when the data in the buffer is written in the non-volatile memory; and
   cause movement of the data temporarily stored in the non-volatile memory and then cause movement of the tape to a tape writing position where the data temporarily stored in the non-volatile memory is to be written to perform append writing on a basis of a predetermined criterion so as to minimize a moving distance by which the tape travels relative to the head when moving from an end position on the tape of read data for an m-th read command to a reading start position for an n-th read command after receipt of the append write command.

5. The apparatus as recited in claim 4, wherein the logic is configured to, in response to receiving an overwrite command of data in a predetermined position on the tape between the mixed commands in the series of commands, cause updating of an overwrite data position as an appended data end position in response to determining that the tape position for overwriting the data is encountered earlier than the appended data end position of the tape.

6. The apparatus as recited in claim 4, wherein the logic is configured to, in response to receiving an overwrite command of data in a predetermined position on the tape between the mixed commands in the series of commands, cause updating of an overwrite data position as an appended data end position in the non-volatile memory in response to determining that the tape position for overwriting the data is encountered later than the appended data end position of the tape.

7. The apparatus as recited in claim 4, wherein the criterion is satisfied when the data end position of the tape at which the data is to be written exists within the moving distance between the end position and the start position.

8. The apparatus as recited in claim 4, wherein the logic is configured to update the data end position after the writing, and cause storing of the updated data end position into the non-volatile memory.

9. The apparatus as recited in claim 4, wherein the non-volatile memory is selected from a group consisting of: non-volatile memory coupled to a tape cartridge, non-volatile memory coupled to the apparatus, and an area on the tape.

10. A non-transitory computer program product for writing data to tape, the computer program product comprising a computer readable storage medium having program instructions embodied therewith, the program instructions executable by a computer to cause the computer to perform a method comprising:
   receiving, by the computer, a series of commands, the series of commands including mixed read, overwrite, and append write commands;
   causing, by the computer, reading of data from a specified position of the tape using a head and storing the data in a buffer in response to a read command; and
   causing, by the computer, writing data stored in the buffer starting from an appended data end position of the tape in response to an append write command.

11. The computer program product as recited in claim 10, comprising program instructions executable by the computer to cause the computer to perform operations of position movement, reading, and writing on the tape back and forth in a longitudinal direction of the tape.

12. The computer program product as recited in claim 10, wherein the buffer is configured to temporarily store data related to reading and append writing, and wherein a read/write head is configured to read data from the tape into the buffer and write data from the buffer onto the tape.

13. The computer program product as recited in claim 12, comprising program instructions executable by the computer to cause the computer to:
   upon receipt of the append write command, store the data stored in the buffer in a non-volatile memory starting from an appended data end position;
   send a completion notification of the append write command to a higher-level device when the data in the buffer is written in the non-volatile memory; and
   move the data temporarily stored in the non-volatile memory and then moving the tape to a tape writing position where the data temporarily stored in the non-volatile memory is to be written to perform append writing on a basis of a predetermined criterion so as to minimize a moving distance by which the tape travels relative to the head when moving from an end position on the tape of read data for an m-th read command to a reading start position for an n-th read command after receipt of the append write command.

14. The computer program product as recited in claim 13, comprising program instructions executable by the computer to cause the computer to, in response to receiving an overwrite command of data in a predetermined position on the tape between the mixed commands in the series of commands, update an overwrite data position as an appended data end position in response to determining that the tape position for overwriting the data is encountered earlier than the appended data end position of the tape.

15. The computer program product as recited in claim 13, comprising program instructions executable by the computer to cause the computer to, in response to receiving an overwrite command of data in a predetermined position on the tape between the mixed commands in the series of commands, update an overwrite data position as an appended data end position in the non-volatile memory in response to determining that the tape position for overwriting the data is encountered later than the appended data end position of the tape.

16. The computer program product as recited in claim 13, wherein the criterion is satisfied when the data end position of the tape at which the data is to be written exists within the moving distance between the end position and the start position.

17. The computer program product as recited in claim 13, comprising program instructions executable by the computer to cause the computer to update the data end position after the writing and store the updated data end position into the non-volatile memory.

18. The computer program product as recited in claim 13, wherein the non-volatile memory is selected from a group consisting of: non-volatile memory coupled to a tape cartridge, non-volatile memory coupled to the computer, and an area on the tape.

19. The computer program product as recited in claim 10, wherein the read commands include first, second, . . . , m-th, n-th . . . , read commands in this order, and wherein n=m+1.

20. An apparatus, comprising:
   a head;
   a controller coupled to the head,
   logic integrated with and/or executable by the controller, the logic being configured to:
   in response to receipt of an append write command, cause storing of data stored in a buffer to a non-volatile memory starting from an appended data end position;
   cause sending a completion notification of the append write command to a higher-level device when data in the buffer is written in the non-volatile memory;
   cause moving to a tape writing position where the data stored in the non-volatile memory is to be written; and
   cause performance of append writing on a basis of a predetermined criterion so as to minimize a moving distance by which a tape travels relative to a head, when moving from an end position on the tape of read data for a m-th read command to a reading start position for a subsequent n-th read command, wherein n=m+1.

* * * * *